United States Patent [19]

Pompei et al.

[11] 4,364,533
[45] Dec. 21, 1982

[54] SIDEWALL PANEL WINDOW ASSEMBLY AND METHOD OF INSTALLING

[75] Inventors: Arturu Pompei, Turin, Italy; John M. Raymond, Edmonds; George D. Sherotsky, Redmond, both of Wash.

[73] Assignee: The Boeing Company, Seattle, Wash.

[21] Appl. No.: 206,591

[22] Filed: Nov. 13, 1980

[51] Int. Cl.³ .............................................. B64C 1/14
[52] U.S. Cl. .................................. 244/129.3; 49/63; 52/213
[58] Field of Search ............... 244/129.3, 129.4, 129.1, 244/121; 52/202, 208, 213, 397, 766; 49/62, 63, 261, 465

[56] References Cited

U.S. PATENT DOCUMENTS 3,906,669  9/1975  Vorguitch ............................ 49/63
4,143,895  3/1979  Kirchweger et al. ................ 49/465

FOREIGN PATENT DOCUMENTS 1117288  11/1961  Fed. Rep. of Germany ........ 52/213

Primary Examiner—Charles E. Frankfort
Attorney, Agent, or Firm—Morris A. Case; Bernard A. Donahue

[57] ABSTRACT

A window access assembly sized to contact the inside surface around the periphery of an opening in a sidewall panel and to extend outward through the opening and make sealing contact with an outside structural window. A support member on the backside of the panel provides a pivot surface for rotating the assembly into position where the assembly is fastened to a structural member secured to the backside of the panel.

7 Claims, 5 Drawing Figures

SIDEWALL PANEL WINDOW ASSEMBLY AND METHOD OF INSTALLING

BACKGROUND OF THE INVENTION

In aircraft, a window access assembly made up of a reveal, a dust cover, a window shade, and shade guide extends from a sidewall panel to the aircraft window. In service, the window shade and the dustcover are often damaged by passenger abuse. The window reveal is sometimes damaged by environmental conditions. In addition, it is sometimes necessary to remove the assembly to provide access to the outside structural window. Replacement of parts or removal for access is difficult as it requires the removal of the passenger seats and the sidewall panels. It was found that a window access assembly, and method of installation of said assembly, will permit an easy and rapid installation and/or removal without the necessity to remove the passenger seats or to remove the sidewall panels.

SUMMARY OF THE INVENTION

A window access assembly having a reveal, a dust stop, and a window shade slidably mounted in a shade guide ha an inner surface sized to mate into the area around an opening in a sidewall panel and a reduced cross section to extend through the opening and make resilient contact with an outside window. A support member, secured to the backside of the sidewall panel and at one side of the opening in the panel acts as a pivot line for projections extending from the assembly, and a structural member secured behind the opening in the panel and adjacent an opposite side of the opening, provides the structure to which the positioned assembly is secured. An opening in the side of the assembly allows the window shade to be extended outside the assembly area where it is supported by a second shade guide secured to the backside of the sidewall panel.

It is an object of this invention to provide a window access assembly and mounting for the assembly to permit the assembly to be quickly installed and quickly removed.

It is another object of this invention to provide ready access to an aircraft window located outboard from a sidewall panel.

DETAILED DESCRIPTION

Figure 1:
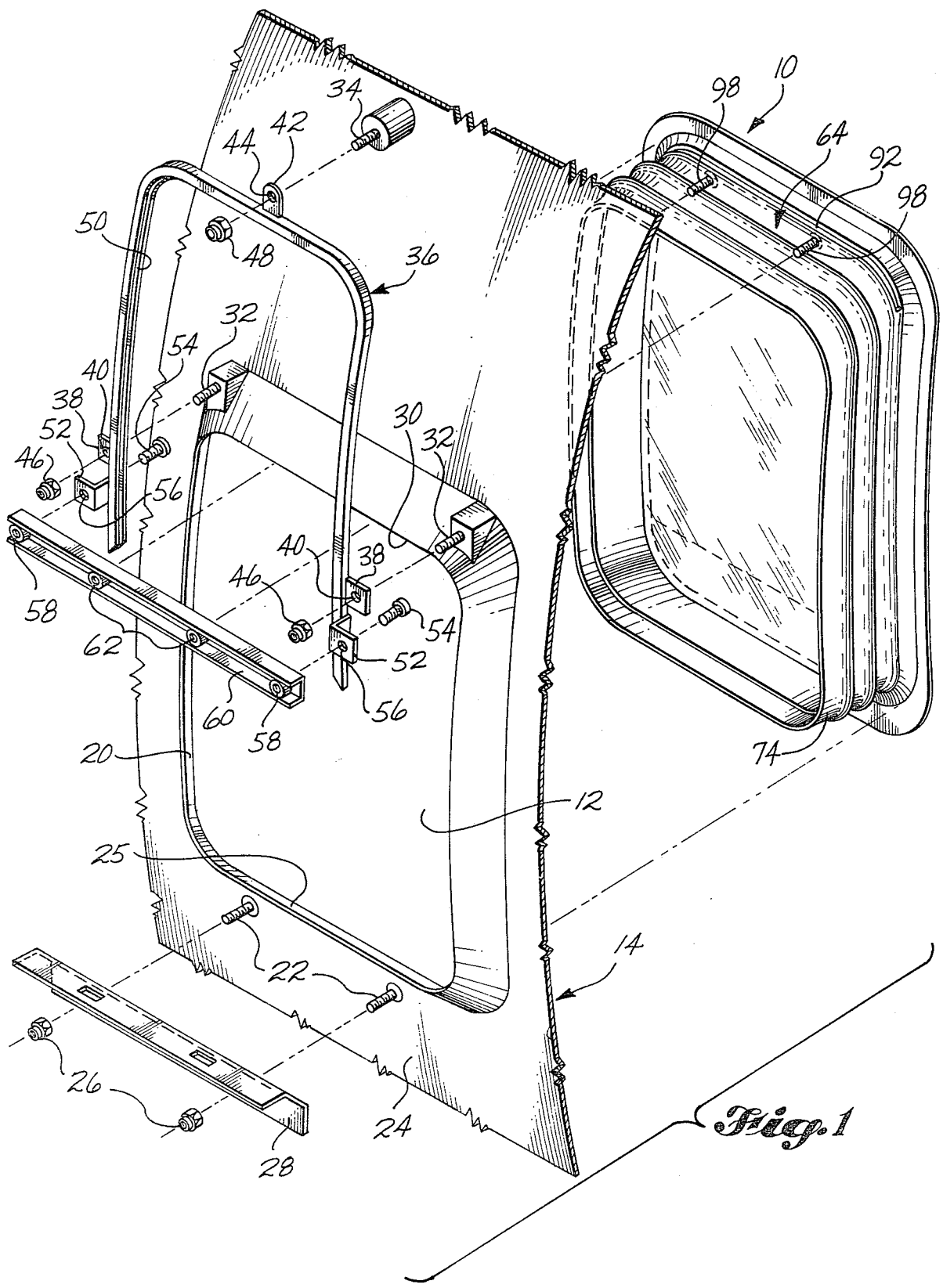
FIG. 1 shows a perspective exploded view of the window access of this invention.
Figure 2:
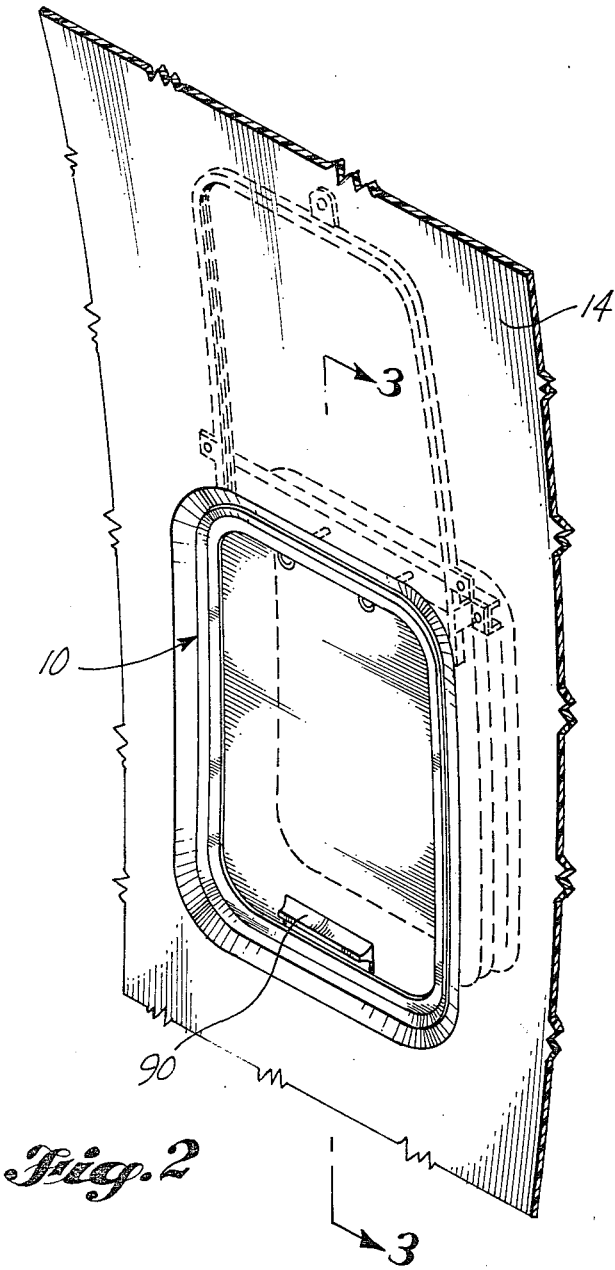
FIG. 2 shows a perspective view taken from a different direction of the invention of FIG. 1 in the installed position.
Figure 3:
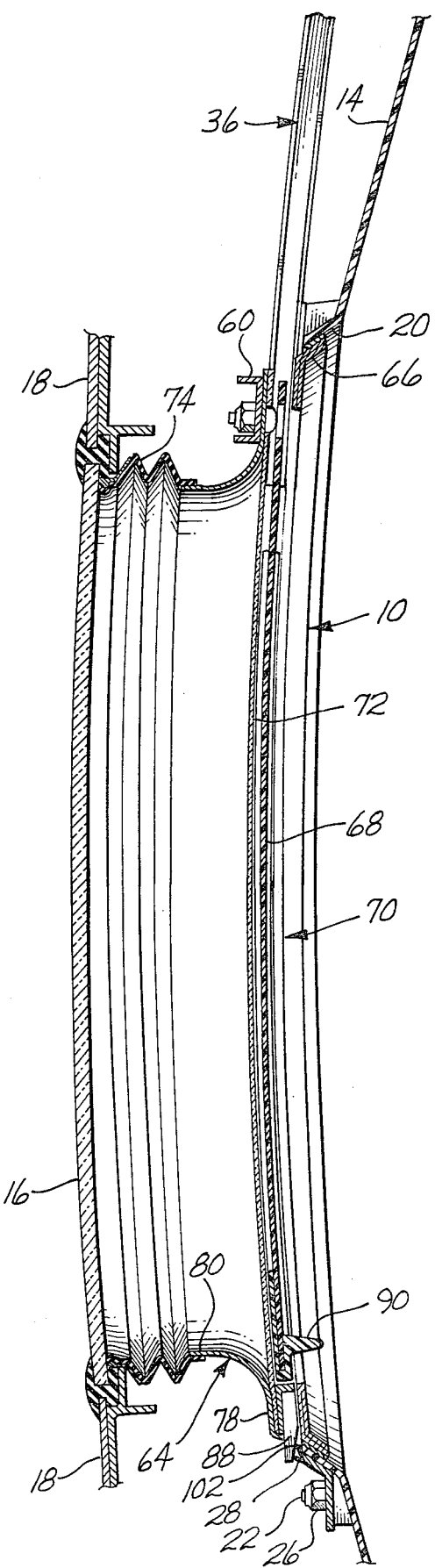
FIG. 3 shows a side elevational sectional view taken along line 3—3 of FIG. 2.
Figure 4:
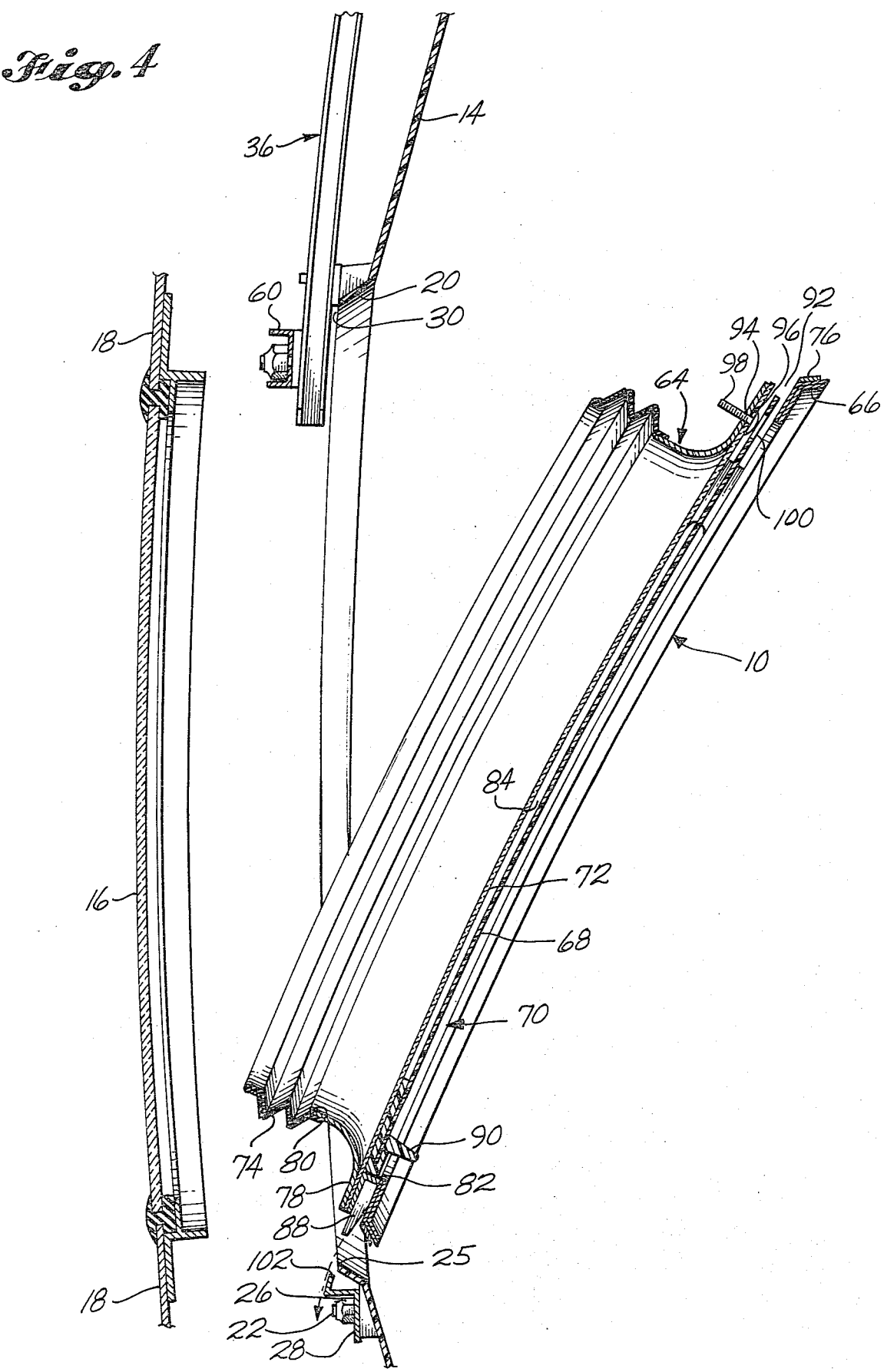
FIG. 4 shows the view of FIG. 3 with the window assembly being positioned for installation.
Figure 5:
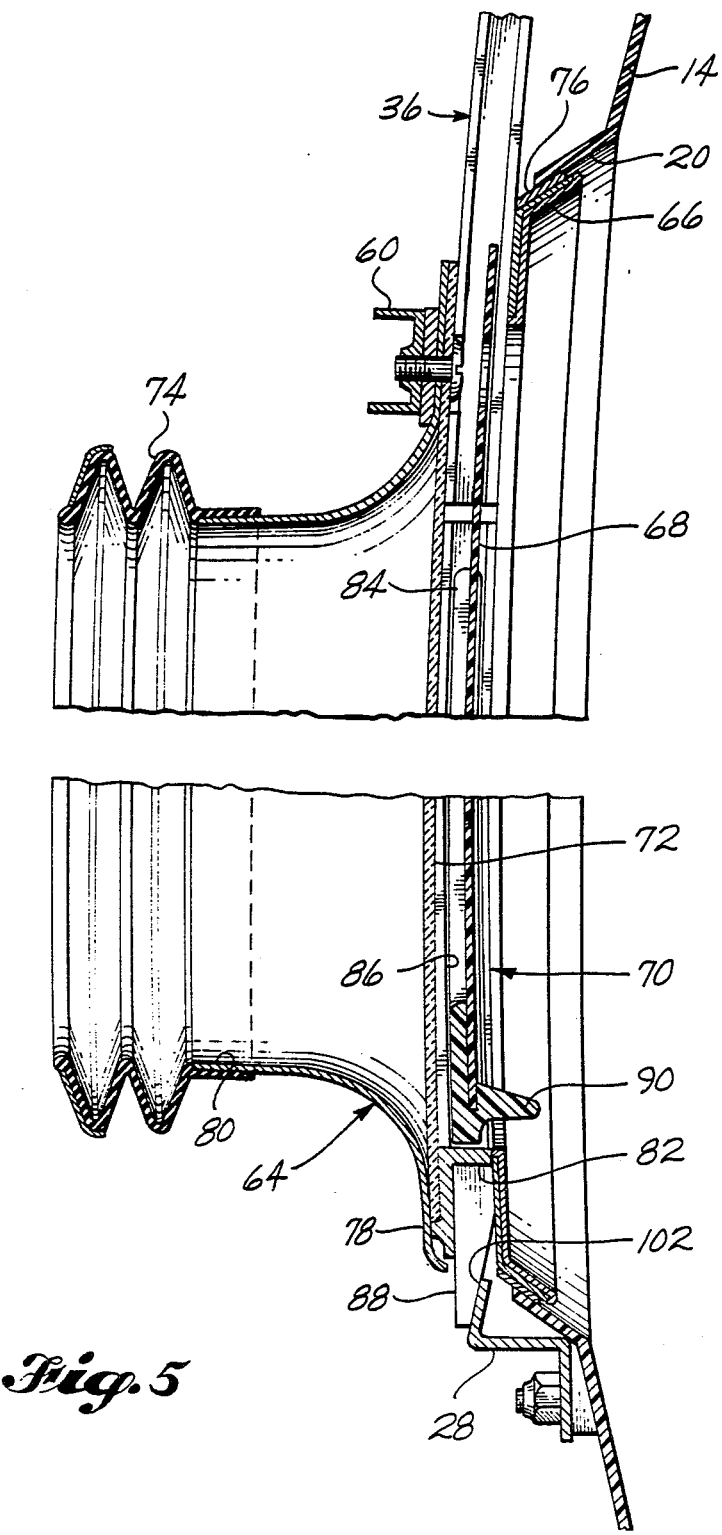
FIG. 5 shows a fragmented enlarged view of FIG. 3.

A window access assembly 10 is formed to fit into an opening 12 in an aircraft sidewall panel 14, and to extend through to an outside structural window 16 mounted to the outer wall 18 of the aircraft. The sidewall panel is tapered outwardly at surface 20 around the periphery of the opening in the panel. A pair 22, of threaded cylindrical shaped members are secured to the outside surface 24 of the sidewall panel. These threaded members are located adjacent a side 25 of the opening, and are used in conjunction with nuts 26 to secure a support member 28 to the panel. This member is preferably of a modified "z" shape. At the opposite side 30 of the opening, three cylindrical shaped threaded members are each joined to the outside surface of the sidewall panel. Two of these threaded members 32 are located adjacent the opening and a third threaded member 34 is located at a distance from the opening. A U-shaped shade guide 36 has a pair of outwardly extending projections 38 with holes 40 located near the ends of the legs and a projection 42 with a hole 44 located at the base of the "U". Nuts 46 and 48 act in conjunction with threaded members 32 and 34 extending through the holes in the projections to fasten the shade guide to the outside surface of the sidewall panel. The shade guide has a slot 50 extending around the inside of the "U" to provide a track for a window shade. The shade guide also has a pair of joined angle sections 52. Bolts 54 extend through holes 56 in the angles and screw into threads 58 in a structural member 60 to secure the structural member to the shade guide. The structural member is threaded at 62 with these threaded parts located outboard of opening 12 and adjacent side 30.

The window access assembly 10 is made up of a window reveal 64, a window trim 66, a window shade 68, a window shade guide 70, a dust cover 72, and a resilient seal 74.

The window reveal has a reduced outside configuration as it extends outward. At its innermost part 76 it is sized to make mating contact along the inside surface of the sidewall panel 14 adjacent the perimeter of the opening 12 in the panel, reduces down to permit entry into the opening, rapidly narrows at 78, and extends outward at its outermost end 80 where the resilient, preferably bellows type, seal 74 is fastened. The dust cover 72 is placed against the inside part of the reveal where the reveal rapidly narrows by moving directly radially inward. The window shade guide 70 presses against the dust cover which in turn is held in position by the window trim 66. This shade guide is also U-shaped with the inside part of the bae 82 of the U-shape to be contacted by and act as a stop for the window shade when the shade is fully located within the assembly. Supports 84 hold the sides of the shade and allow slideable movement in slots 86 along the inside legs of the U-shaped shade guide 70. A pair of tapered projections 88 extend from the base of the shade guide to a point outside the contour of the window reveal. The window shade is slideably moveable and is positioned with use of shade handle 90. The reveal 64 has an opening or slot at 92 to permit the shade to extend outside the assembly 10. Adjacent the opening, the reveal has a pair of holes 94 which align with a pair of holes 96 in the dust cover 72. These holes are sized to permit the shank of screws 98 to extend through, but to be held captive in the holes and will provide a stop for the head of the screws. When the shade is in the fully closed position, a pair of holes 100 which are smaller than the head on the screws, extend through the shade and align with the holes in the dust stop and reveal to permit access through the shade for setting the screws.

To install the window access assembly 10 in the sidewall panel 14, the support member 28, the U-shaped shade guide 36 and the support structure 60 are secured to the outboard side of the sidewall panel. The tapered extensions 88 on the assembled window access are placed through the opening 12 and rest against end 102 of the support member 28. This acts as a pivot line for the assembly which is rotated into position with the projection remaining in contact with the support member, the resilient seal 74 contacting window 16, the surface 76 of the reveal in mating contact with inside surface 20 of the sidewall panel, and the holes through the reveal, the dust cover and the shade aligned with the threads 62 in the structural member 60. Next the screws 98 are secured in threads 62 and the assembly is ready for use. To remove the window access assembly, it is only necessary to remove screws 98 and rotate the assembly away from the opening.

It is claimed:

1. An aircraft window access assembly and mounting for rapid installation in and removal from an opening in an aircraft sidewall panel for providing viewing through and access to an aircraft window, with the assembly and mounting comprising: a window access assembly having a surface sized to make mating contact along the inside surface of a sidewall panel adjacent the perimeter of an opening in the sidewall panel, a reduced cross section of the assembly to extend outward and contact an aircraft window, a slideably mounted window shade to control viewing out the window, a dust stop located outboard from the shade, a pair of projections to extend outside the cross section of the assembly, a support member mounted to the outside surface of the sidewall panel and located to be contacted by the projections to pivot the assembly into and fill the opening in the sidewall panel, means for securing the positioned assembly to the sidewall panel, and means for supporting the window shade when it is in the opened position.

2. An aircraft window access assembly and mounting as in claim 1 wherein the means for securing the positioned assembly to the sidewall panel comprises: a structural member secured to the outside surface of the sidewall panel with said member outboard from and extending across the opening in the panel adjacent a side of the opening opposite the location of the support member for the projections, threaded means located in the structural member, and fasteners on the access assembly to be joined to the threaded means on the structural member.

3. An aircraft window access assembly and mounting for rapid installation in and removal from an opening in an aircraft sidewall panel for providing viewing through and access to an aircraft window, with the assembly and mounting comprising: a window reveal having a reduced outside configuration as it extends outward; a resilient seal joined to and extending outward from the outer end of the reveal; a dust cover; a window shade guide mounted adjacent the inside end of the reveal, the guide having a pair of projections to extend outside the window reveal, and the reveal having an opening diametrically located with respect to the projections on the guide; a window shade slideably mounted in the guide; means mounted to the outside of the sidewall panel for acting as a pivot line for the projections to rotate the access assembly into position in the sidewall panel; means mounted to the outside of the sidewall panel for securing the positioned assembly in the panel, and means mounted to the sidewall panel for supporting a guide for the window shade when the shade has been moved aside to permit viewing.

4. A aircraft window access assembly and mounting for rapid installation in and removal from an opening in an aircraft siwewall panel for providing viewing through and access to an aircraft window, with the assembly and mounting comprising: a window reveal with a changing periphery sized to mate with an inside surface around an opening in a sidewall panel, to extend outward through the opening, to rapidly narrow and again to extend outward; a resilient seal joined to the outermost end of the reveal; a translucent dust stop to extend across the reveal before it rapidly narrows; a hade guide with a slideably mounted window shade located adjacent to and inboard from the dust stop; an opening through a side of the reveal to permit opening the window shade; a pair of projections to extend outside the reveal at a location adjacent the shade guide and opposite the opening through the side of the reveal; a window trim located to cover the inboard surface of the reveal and to secure the shade guide in position to form a window access assembly; a support member joined to the outside surface of the sidewall panel and located to act as a pivot line against the projections to rotate the assembly into position in the opening in the sidewall panel; a support structure joined to the outside surface of the sidewall panel and located to extend outboard of and across the opening in the panel adjacent the side opening in the reveal; means for joining the positioned access assembly to support the structure; and means for supporting the window shade when in the opened position.

5. An aircraft window access assembly and mounting as in claim 4 wherein the means for joining the positioned access assembly comprises: the support structure having a pair of threaded recesses, and fasteners to extend through the reveal and into the threads on the structure.

6. An aircraft window access assembly and mounting as in claim 5 wherein the means for supporting the window shade when in the opened position comprise a U-shaped guide having the open ends fastened to the support structure and the base fastened to the inside surface of the panel.

7. A method of mounting a window access assembly in an opening in an aircraft sidewall panel, with steps comprising: locating a support member outboard of and adjacent a side of an opening in an aircraft sidewall panel, fastening a structural member outboard of and behind an opposite side of the opening, joining a window shade guide to the back side of the sidewall panel and opposite the location of the support member, utilizing a window access assembly shaped to fit into the opening in the sidewall with an outermost part resiliently contacting an aircraft window and the innermost part resting against the inside surface around the sidewall panel, inserting the assembly into the opening with projections on the assembly contacting the support member, pivoting the assembly on the support member and into position, and fastening the positioned assembly to the structural member.

* * * * *